(12) United States Patent
Manning

(10) Patent No.: US 8,306,673 B1
(45) Date of Patent: Nov. 6, 2012

(54) ELECTRONIC CONTROLS AND OPTIONS FOR POWERED RIDING MACHINES

(76) Inventor: Doug Manning, Banner Elk, NC (US)

( * ) Notice: Subject to any disclaimer, the term of this patent is extended or adjusted under 35 U.S.C. 154(b) by 55 days.

(21) Appl. No.: 13/114,028

(22) Filed: May 23, 2011

Related U.S. Application Data

(63) Continuation-in-part of application No. 12/106,323, filed on Apr. 20, 2008.

(60) Provisional application No. 60/912,940, filed on Apr. 20, 2007, provisional application No. 61/347,423, filed on May 23, 2010.

(51) Int. Cl.
  *B62M 6/00* (2010.01)
  *G05D 1/00* (2006.01)
  *G06F 17/00* (2006.01)
(52) U.S. Cl. ............... 701/1; 701/21; 701/22; 701/31.4; 701/31.5; 701/412; 280/87.041
(58) Field of Classification Search ................ 701/1, 21, 701/22, 29, 33, 35, 36, 70, 93, 29.1, 31.4, 701/31.5, 32.3, 32.4, 33.2, 400, 408, 409, 701/412; 280/87.041, 87.042; 180/65.51, 180/167
See application file for complete search history.

(56) References Cited

U.S. PATENT DOCUMENTS

| | | | | | |
|---|---|---|---|---|---|
| 5,816,352 | A * | 10/1998 | Hacker | .................... | 180/167 |
| 6,890,224 | B2 * | 5/2005 | McCann | ..................... | 440/6 |
| 6,901,872 | B1 * | 6/2005 | Battle et al. | ............... | 114/55.56 |
| 6,904,341 | B2 * | 6/2005 | Kish et al. | .................. | 701/21 |
| 7,444,213 | B2 * | 10/2008 | Motose | ..................... | 701/21 |
| 2006/0170174 | A1 * | 8/2006 | Hiramatsu | ............. | 280/87.041 |

* cited by examiner

*Primary Examiner* — Thomas Tarcza
*Assistant Examiner* — Edward Pipala
(74) *Attorney, Agent, or Firm* — Monty Simmons; Simmons Patents

(57) ABSTRACT

The present invention relates to a power riding apparatus with electronic options, a wireless user interface for control such apparatus, and a wave-information-system. One embodiment of the power riding apparatus is a surfboard configured with a booster system. An alternative embodiment is a motorized land board, such as a skateboard with a motor.

The booster system or land board motor is electrically associated with an onboard controller. The onboard controller is in wireless communication with a user interface associated with a user. The user activates the user interface as desired to control the booster system and activate other board features such as: lighting system, repellant system, anti-theft system, entertainment system, recording system, and communication system.

20 Claims, 13 Drawing Sheets

ELECTRONIC CONTROLS AND OPTIONS FOR POWERED RIDING MACHINES

CLAIM TO PRIORITY

This application claims priority to provisional application 61/347,423, filed on May 23, 2010 and is further a continuation in part to application Ser. No. 12/106,323, filed Apr. 20, 2008, which claims priority to provisional application 60/912,940, filed on Apr. 20, 2007, the entire contents of all such reference are hereby incorporated herein by this reference for all that they disclose for all purposes.

TECHNICAL FIELD OF THE INVENTION

The present invention relates to control systems for on-road and off-road powered riding apparatuses which may include numerous controllable systems including a: booster system, lighting system, anti-theft system, entertainment system, recording system, and communication system. Embodiments of such powered riding apparatuses include water vehicles such as powered surf boards an and types of land machines including skate boards, road boards, mountain boards, all terrain boards, land boards and powered inline skates.

BACKGROUND OF THE INVENTION

Many new powered riding devices designed to be ridden while standing have been developed in recent years. Such devices included water vehicles such as powered surfboards or water boards, and land vehicles such as powered skate boards, longboards (essentially a surfboard on wheels), off-road "all terrain" boards. Such devices and are designed to provide, as far as possible, the same experience of riding an unpowered version of such machines. These devices can be shaped in various different ways and configured with any number of propulsion systems and other systems such as lights, entertainment, and recording systems.

While many prior art powered riding devices work well and are entertaining to operate, all such systems have a common drawback: the control system. As noted above, for unpowered systems, there is no "control" tether associating the device operator to the machine/device. However, for most prior art powered machines, the control system used to control the operation of the propulsion systems comprise a controller held by an operator wherein such controller is tethered to the propulsion systems. Thus, the control system basically tethers the user to the powered machine. While such machines may be fun to ride and operate, the control tether takes away for the "feel" of the original unpowered experience.

Some system are said to have "wireless" hand held controllers that use an RF signal to send control signals form the operator to the power device. However, such systems are said to be unreliable and using a handheld controller still takes away from the "feel" of the original unpowered experience. Additionally, Such prior art control systems provide little or no information to the user.

What is needed is an electronic module based control system configured to control the systems of a powered machine, including the propulsion system, where such electronic module is associated with a user in a way that better approximates the "feel" of an unpowered version of such powered machine. Further, such a controller should use a reliable wireless communication association with the powered machine and would preferably provide a plurality of information such as at least one of the following: location data for locating the device, emergency information, board status, fuel status, and environmental warnings. The controller would ideally also provided control functionally for a plurality of subsystems such as display technology, booster system control, propulsion system control, lighting system control, repellant system control, anti-theft system control, entertainment system control, recording system control, safety system control, and communication system control.

SUMMARY

Some of the objects and advantages of the invention will now be set forth in the following description, while other objects and advantages of the invention may be obvious from the description, or may be learned through practice of the invention.

Broadly speaking, a principle object of the present invention is to provide a wireless controller for the propulsion systems of powered riding devices.

Another object of the present invention is to provide a wireless controller for the propulsion systems of powered riding devices where a user stands on the powered riding device and wherein said controller is associated with at least one hand of said user.

Yet another object of the invention is to provide a wireless controller for the propulsion systems of powered riding device wherein the controller is disposed in a sealed container and wherein user control signals are electronically coupled to said controller.

Still another object of the invention is to provide a wireless controller for the propulsion systems of powered riding device wherein said controller is further configured to control other systems including: location systems for locating such controller (and a user associated with such controller) and the powered riding device electrically associated with the controller, emergency information system, environmental warning system, display technology, booster system, a lighting system, a repellant system, an anti-theft system, an entertainment system, a recording system, safety system, and a communication system.

Another object of the invention is to provide a wireless controller for the propulsion systems of powered riding devices wherein said wireless controller is configured for being electrically and operably associated with a personal communication device carried by a user including devices such as cell phones, walkie-talkies and two way radios systems.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1:
FIG. 1 is a top view of one exemplary embodiment of a water board showing an access point and lighting features.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description.

Repeat use of reference characters is intended to represent same or analogous features, elements or steps. It is to be understood by one of ordinary skill in the art that the present discussion is a description of exemplary embodiments only, and is not intended as limiting the broader aspects of the present invention.

For the purposes of this document two or more items are "mechanically associated" by bringing them together or into relationship with each other in any number of ways including a direct or indirect physical connection that may be releasable (snaps, rivets, screws, bolts, etc.) and/or movable (rotating, pivoting, oscillating, etc.) Similarly, two or more items are "electrically associated" by bringing them together or into relationship with each other in any number of ways including: (a) a direct, indirect or inductive communication connection, and (b) a direct/indirect or inductive power connection. Additionally, while the drawings may illustrate various electronic components of a system connected by a single line, it will be appreciated that such lines may represent one or more signal paths, power connections, electrical connections and/or cables as required by the embodiment of interest.

This document includes headers that are used for place markers only. Such headers are not meant to affect the construction of this document, do not in any way related to the meaning of this document nor should such headers be used for such purposes.

While the particulars of the present invention and associated technology may be adapted for use with any type of riding device with electronic systems, whether designed to be used while standing, or not, such as powered surfboards, powered land boards, and powered skates, the examples discussed herein are primarily in the context of powered devices to be used while standing.

Referring now to FIG. 1 is a top view of a surfboard (10) showing an access point, covered by access hatch (14), and lighting features according to one exemplary embodiment of the invention. For the presently preferred embodiment of the invention surfboard (10) is the general size and shape of a traditional surfboard. Surfboard (10) comprises access hatch (14) for covering an access point configured to allow access to interior components. Such access hatch (14) does not necessarily form a water tight seal. Toward the front of surfboard (10) are light modules 16a, 16b and 16c. It should be appreciated that such light modules may be positioned in other locations and that additional light modules may be added.

For the present embodiment of the invention, Light modules 16a, 16b, 16c, and 16d are low voltage; low power consumption modules that include a self contained replaceable battery. One suitable light technology includes light emitting diodes (LED). Such light modules are releasably associated with surfboard (10). For the preferred embodiment such light modules are electrically associated with a controller associated with a user. Such a configuration allows remote activation of the light modules as defined later in this document. Alternatively, such light modules may simply comprise a switching device that is actuated to turn the light module on/off. One possible switch type is a magnetic switch such as a reed switch or weigand wire that is actuated using a magnetic element. Such a switch enhances the ability to waterproof the module. For the presently preferred embodiment, such light modules comprise wireless communication circuitry configured for communication with a controller. For one embodiment, such communication capabilities include a receiver configured to receive control signals (such as a turn on/off signal) from the controller. For such an alternative embodiment, communication capabilities include a transmitter for transmitting data to a remote device such as the controller. Such transmitted data may include, for example, battery status information. Suitable communication technologies include Bluetooth and Zigbee.

Lighting modules (16a), (16b), (16c), and (16d) may further comprise a local activation mechanism for enabling and disabling the lighting modules. For such a configuration, lighting modules (16a), (16b) and (16c) may be disabled to prevent unnecessary power drain by the receiver. Suitable activation mechanisms include a magnetic sensor such as a reed switch, Hall Effect device, weigand wire, or other suitable magnetic device.

For the preferred embodiment of the lighting modules (16a), (16b), (16c), and (16d) comprising wireless communication capabilities, the module is fully self contained in a substantially water proof, shock resistant light housing. Such light housing is configured for being mechanically associated with surfboard (10). In addition, for one embodiment, at least one light module is configured for being disassociated with surf board (10) and carried and used as traditional flash light.

Figure 2:
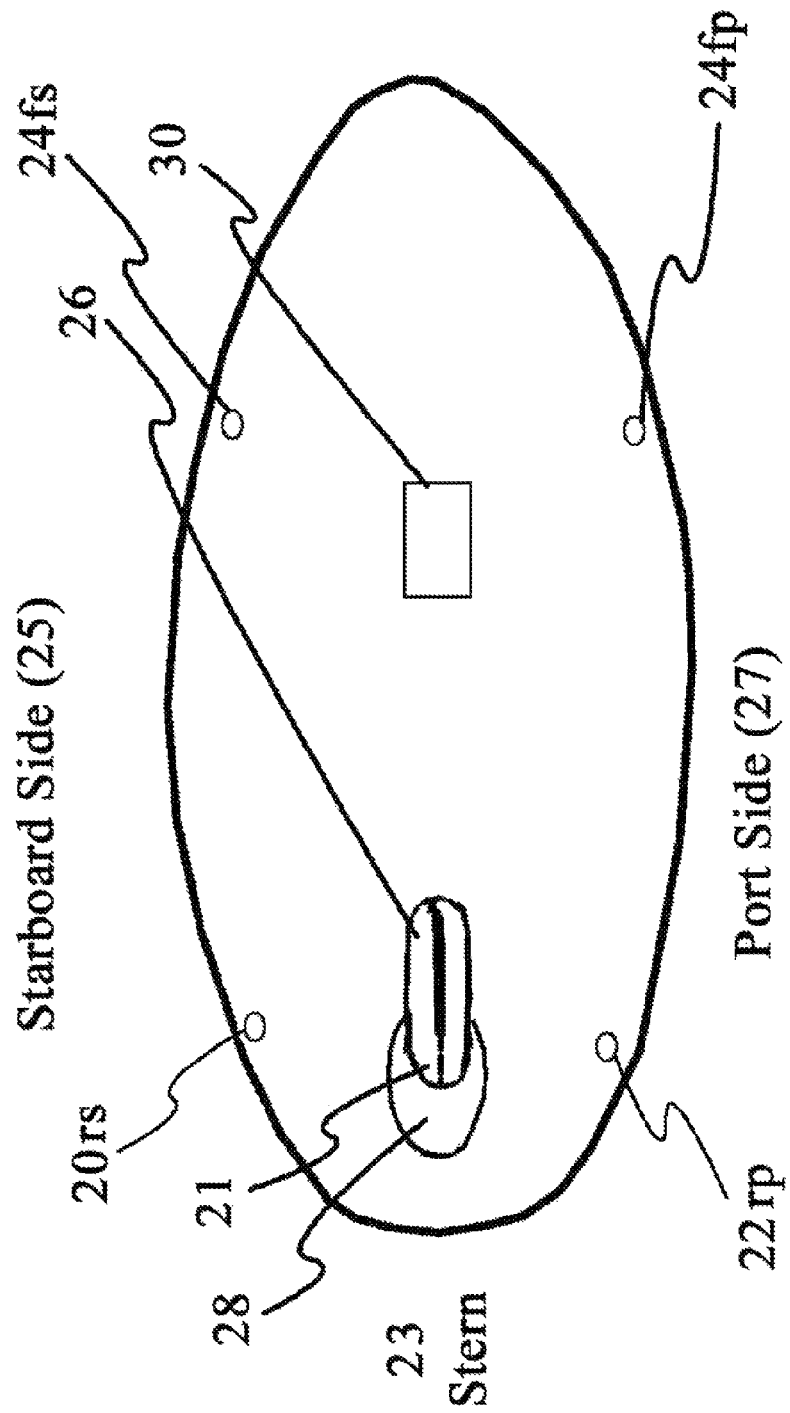
FIG. 2 is a bottom view of one exemplary embodiment of a water board showing output ports, intake, a deterrent system output ports, and a control rudder.

Referring now to FIG. 2, a bottom view of the exemplary embodiment of the present invention depicted in FIG. 1 is presented. Surfboard (10) comprises output port (20rs) (rs=rear, starboard), (22rp) and (28). It should be appreciated that any number of ports may be used, including only one port, without departing from the scope and spirit of the invention. The function of such ports will be described in more detail below.

Figure 4:
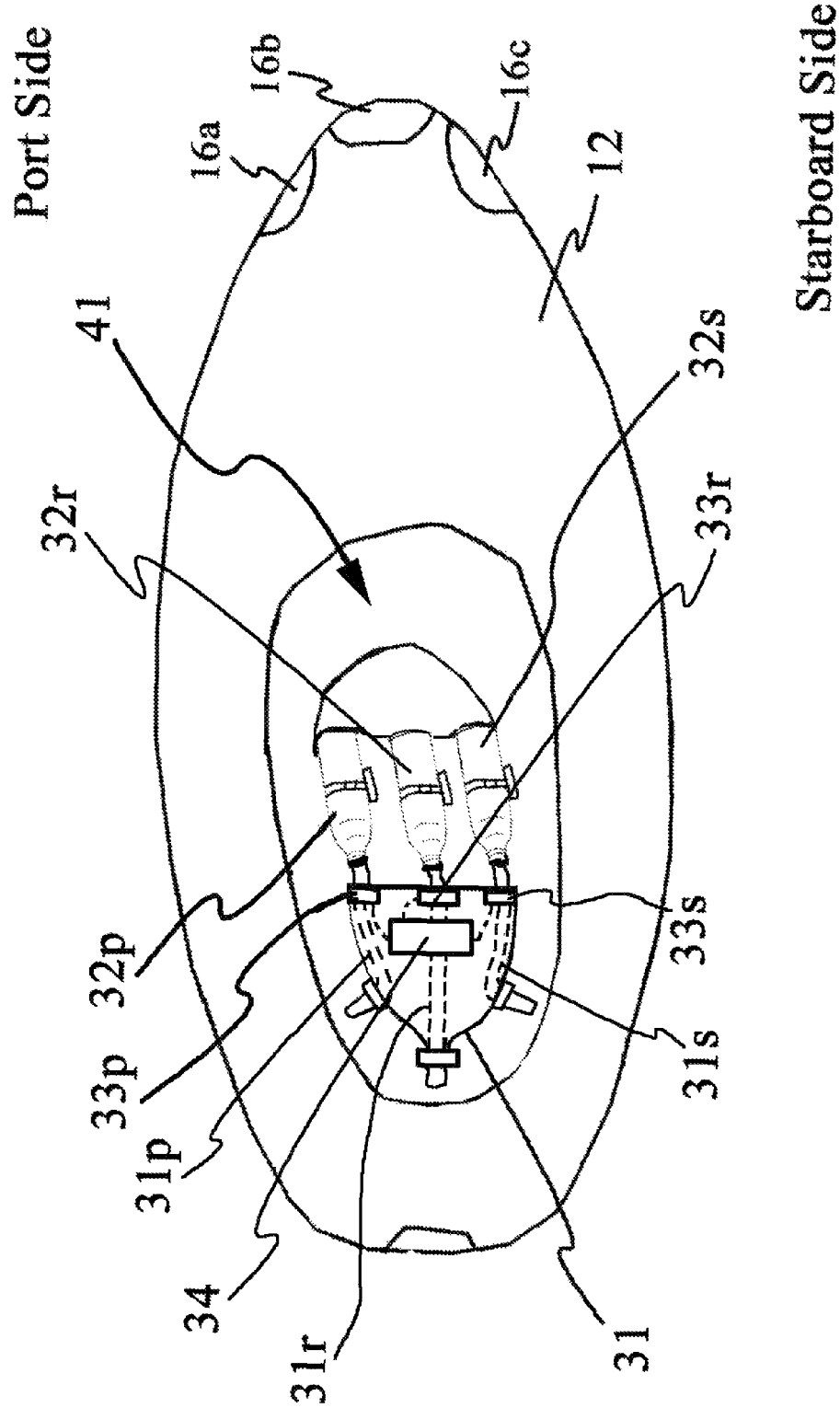
FIG. 4 is a top view of one exemplary embodiment of a water board with a access point hatch removed revealing a propulsion manifold mechanically associated with a substance-source further electrically associated with a controller.

Surfboard (10) further comprises control rudder (26). For the presently preferred embodiment, control rudder (26) is of conventional design. For one alternative embodiment, control rudder (26) is movably associated with surfboard (10) so that control rudder (26) may be rotated in respect to the bottom of surfboard (10). For such an alternative embodiment, control rudder (26) is mechanically associated with a control motor configured for rotating control rudder (26) so that the distal end (21) points toward the stern (23), the starboard (25) direction, or the port (27) direction. The control motor is electrically associated with, and is in electrical communication with, board controller (34) (FIG. 4). As will be described later, board controller (34) is in electrical communication with a remote module associated with a user.

Surfboard (10) further comprises port (30), port (24fs) (fs=front, starboard) and port (24fp). For one embodiment, such ports provide an output port for a deterrent system. Such deterrent system will be described in more detail later. For yet another alternative embodiment of the invention, any one of ports (30), (24fp) and (24fs) may be configured to provide exhaust ports for a propulsion or booster system described later.

Figure 3:
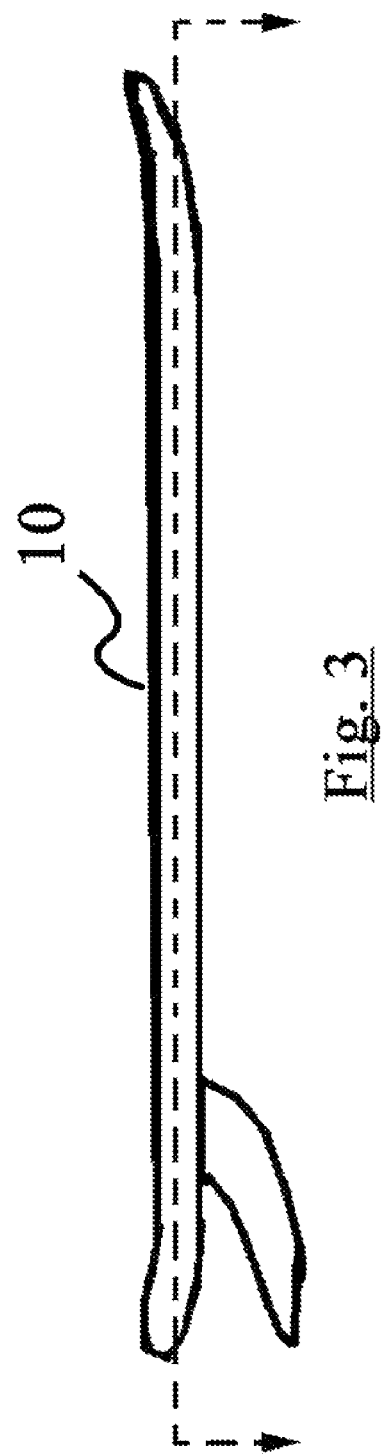
FIG. 3 is a side view of one exemplary embodiment of the water board presented in FIG. 1 and FIG. 2.

FIG. 3 is a side view of the exemplary embodiment of surfboard (10) presented in FIG. 1 and FIG. 2. As depicted in FIG. 1, FIG. 2 and FIG. 3, it should be appreciated that for the presently preferred embodiment of the invention, the physical dimensions of board (10) (length, width, and height) are similar to traditional prior art surf boards.

Referring now to FIG. 4, a top view of the exemplary embodiment of the invention depicted in FIG. 1 with access hatch (14) removed thereby revealing an internal void (41) defined by the surfboard structure (12). Disposed within the internal void (41) is a propulsion manifold (31) mechanically associated with substance-source (32r, rear), (32p, port), and (32s, starboard) via thrust-valves (33r), (33p), and (33s) respectively. The output side of thrust-valve (33r) is mechanically associated with output port (28) via manifold path (31r). The output side of thrust-valve (33p) is mechanically associated with output port (22rp) via manifold path (31p). The output side of thrust-valve (33s) is mechanically associated with output port (20rs) via manifold path (31s).

For the presently preferred embodiment, thrust-valves (33) are flow control components electrically associated with controller (34). Such flow control components comprise an input and an output separated by an electrically controlled valve component. The valve component is configured for receiving control signals from controller (34) and changing its open/closed stated based on such control signals. Such control signals may simply be a power signal supplied to a valve component or, alternatively, a signal received by an onboard valve controller depending on the valve configuration. Exemplarily embodiments of electronic thrust-valves (33) include a magnetic latching valve, a motor driven valve, and electrically controlled solenoid valve.

Thrust-valves (33) may be electronically controlled: (i) close and prevent a substance within substance-source (32) from exiting the substance container, (ii) open and allow a substance within substance-source (32) to exit the substance container and flow into propulsion manifold (31) and out an output port, and (iii) open and allow a substance to be injected into substance-source (32) thereby replenishing/recharging substance-source (32). The electrical association between thrust-valves (33) and controller (34) may be a wired or wireless connection communication and/or power connection.

For one alternative embodiment, thrust-valve (33) may be a one-way valve. For such configuration, thrust-valves (33) comprise a check-valve to prevent reverse flow. Substance-sources (32) are recharged by either replacing substance-sources (32) or removing substance-sources (32) from surfboard (10), recharging/replenishing substance-sources (32), and reinstalling substance-sources (32). Alternatively, the mechanical connection between substance-sources (32) and propulsion manifold (31) may be removed and a recharging/replenishing device mechanically associated with substance-sources (32) allowing substance-source (32) to be recharged/replenished without removing substance-source (32) from surfboard (10).

It should be appreciated that substance-source (32) comprises a container for holding a substance that can be expelled at relatively high speeds to create thrust. One suitable embodiment of a substance-source (32) comprises a container configured for storing a gas under high pressure. For example, substance-source (32) may be a tank or module for housing compressed gases such as air or $CO_2$. Additionally, while the preferred embodiment comprises an independent substance-source (32) for each flow path, alternative embodiments using only one substance-source (32) connected to multiple flow paths fall within the scope and spirit of the present invention.

Motorized Land Board

Figure 5:
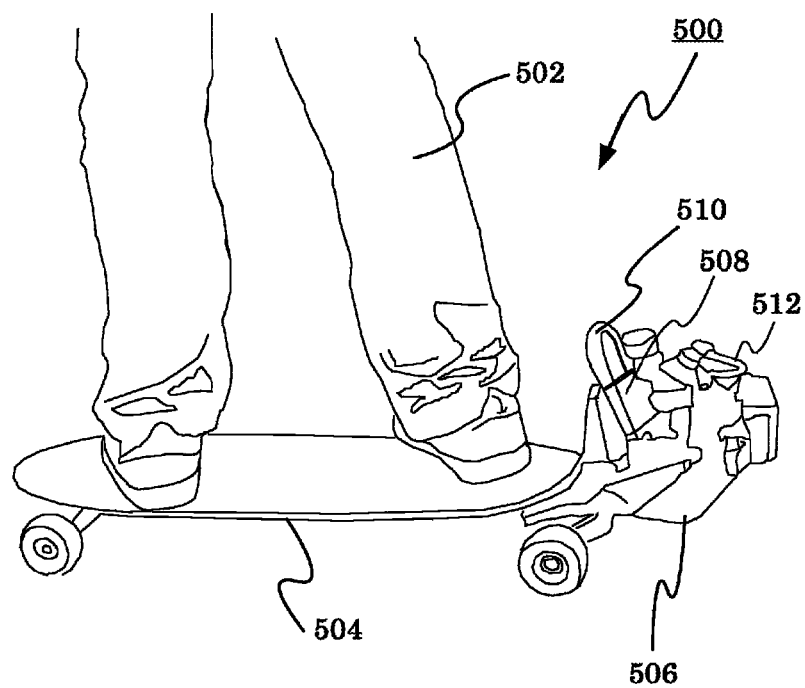
FIG. 5 is a side perspective view of one exemplary embodiment of a user riding one exemplary embodiment of a user on a powered skateboard.

Referring now to FIG. 5, a side elevated perspective view (500) of a user (502) on one exemplary motorized land board (504) is presented. It should be appreciated a "motorized land board" may be any powered device configured to be ridden on land such as skates of all types, skateboards, longboards (essentially a surfboard on wheels), and off-road "all terrain" boards. For the currently preferred embodiment, motorized land board (504) is a skateboard associated with a liquid fuel powered motor (506) mechanically and/or electrically associated with machine control module (508). Notably, the propulsion system of the motorized land board (504) may be a liquid fuel (such as gasoline) based engine, a solid fuel based engine, and an electric motor without departing from the scope of the current invention. It should be noted that for this document, a gas powered "motor" and a gas powered "engine" refers to the same device (i.e. "motor" and "engine" are the same).

Figure 5B:
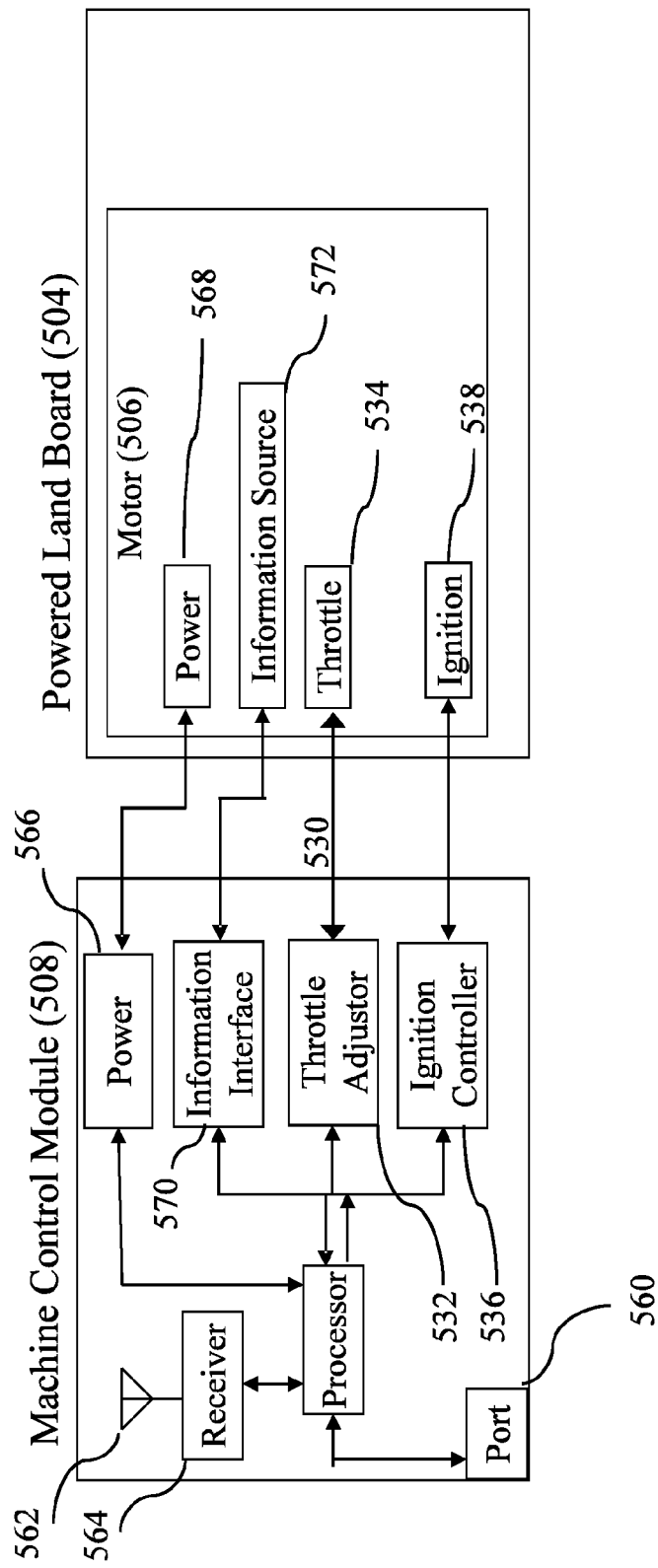
FIG. 5b is a block diagram representation of one exemplary motorized land board with an electronic control module.

Referring now to FIGS. 5 and 5*b*, for the current embodiment, the throttle control system (534) for the fuel powered motor (506) is mechanically associated via a cable and/or linkage (530) with a throttle adjustor (532). Any suitable technology may be used as a throttle adjustor including (a) electrical servos that provide feedback to the control module (508) or, alternatively, (b) a simple motorized device configured to open and close the throttle (534). Such throttle adjustor (532) devices are preferably at least partially disposed inside of machine control module (508). Additionally, machine control module (508) may comprise an ignition controller (536) configured to control any of the motorized land boards (504) ignition components (538) such as the stator, coil, or electronic ignition. For one alternative embodiment, ignition controller (536) comprises a CDI ignition system (Capacitor Discharge Ignition that may be programmable and dynamically and remotely controlled) that controls the spark generated by the system and transferred to plug (512). CDI ignition systems are well known in the art and a detailed description thereof is not necessary for providing an enabling disclosure of the invention. Machine Control module (508) comprises at least one of an external antenna and an internal antenna (562). For one embodiment, handle (510) comprises an antenna electrically associated with a transmitter or receiver (564) disposed in machine control module (508). The specifics of the machine control module (508) will be discussed in more detail below.

The Machine Control Module may further contain a power source (566) which may be a stand along power source or may be further configured for being connected to a power generator (568) associated with motor (506) or an external charger such as a photovoltaic device.

Information Interface (570) is configured for being associated at least one external information source such as information source (572) associated with powered land board (504). For the embodiment depicted in FIG. 5*b*, such information source (572) may be one or more of: (a) a temperature sensor configured for generating sensor signals representative of a temperature including the motor temperature and ambient air temperature, (b) a RMP sensor configured for generating sensor signals representative of the motors RPMs, (c) a fuel sensor configured for generating sensor signals representative of the amount of fuel remaining in a fuel source, (d) a power quality sensor configured for generating sensor signals representative of output power levels of power generator 568, and (e) a speed sensor configured for generating sensor signals representative of the speed of the motorized land board (504).

Port (560) may be configured for any number of uses including programming the processor or updating firmware or interfacing the processor with an external controller associated with a user.

For four wheeled land vehicles, motorized land board (504) may use air filled, liquid filled, and/or solid filled tires. For road boards, motorized land board is about 4 feet to 6 feet long with the motor disposed at the rear of the board as depicted in FIG. 5. The output of the motor is linked to the rear axle connecting the rear tires with a chain and sprocket. One alternative embodiment is to position the motor so the output of the motor turns a shaft that connected at least one rear tire.

Electronic Glove Module

Figure 6:
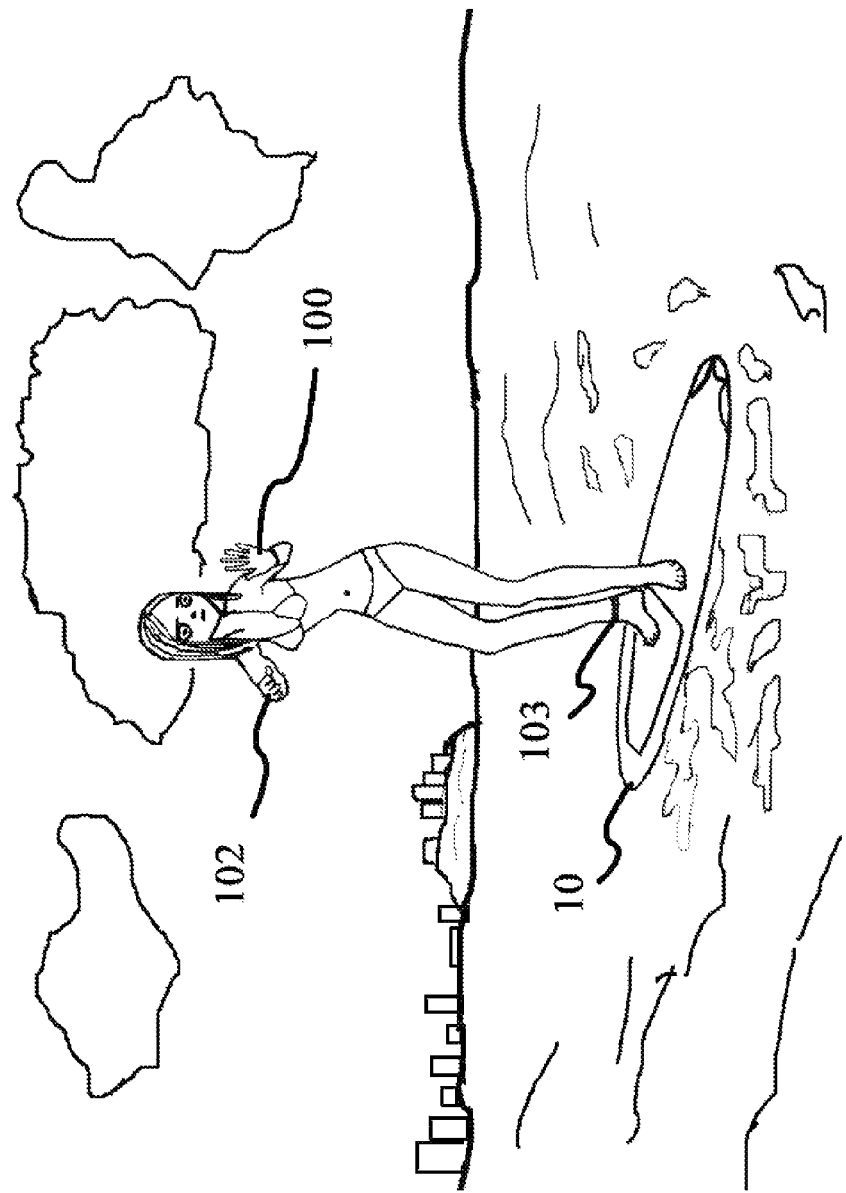
FIG. 6 is a top perspective view of one exemplary embodiment of a user standing on a water board where the user is associated with a wireless controller incorporated into a user module.

Referring now to FIG. 6, a side perspective view of a surfboard according to one exemplary embodiment of the invention is presented with a user standing on the surfboard (10) where the user is associated with a user interface (100). For the presently preferred embodiment, user interface (100) comprises a glove structure associated with an electronic module (112, FIG. 7). A second user interface (102) may be associated with the other user's hand. Additionally, the user may be further associated with an ankle strap (103). Such user interfaces and ankle strap devices are configured with wireless technology for remotely controlling surfboard (10) features.

For example, ankle strap (103) may be configured with wireless technology that is in communication with controller (34). The ankle strap (103) transmits a low powered transponder signal that is received by controller (34). Controller (34) may be configured to perform a variety of functions depending on whether or not the transponder signal is present. For example, should a user wearing ankle strap (103) fall off of surfboard (10), the transponder signal would be lost and controller (10) would deactivate/activate a surfboard feature.

Figure 7:
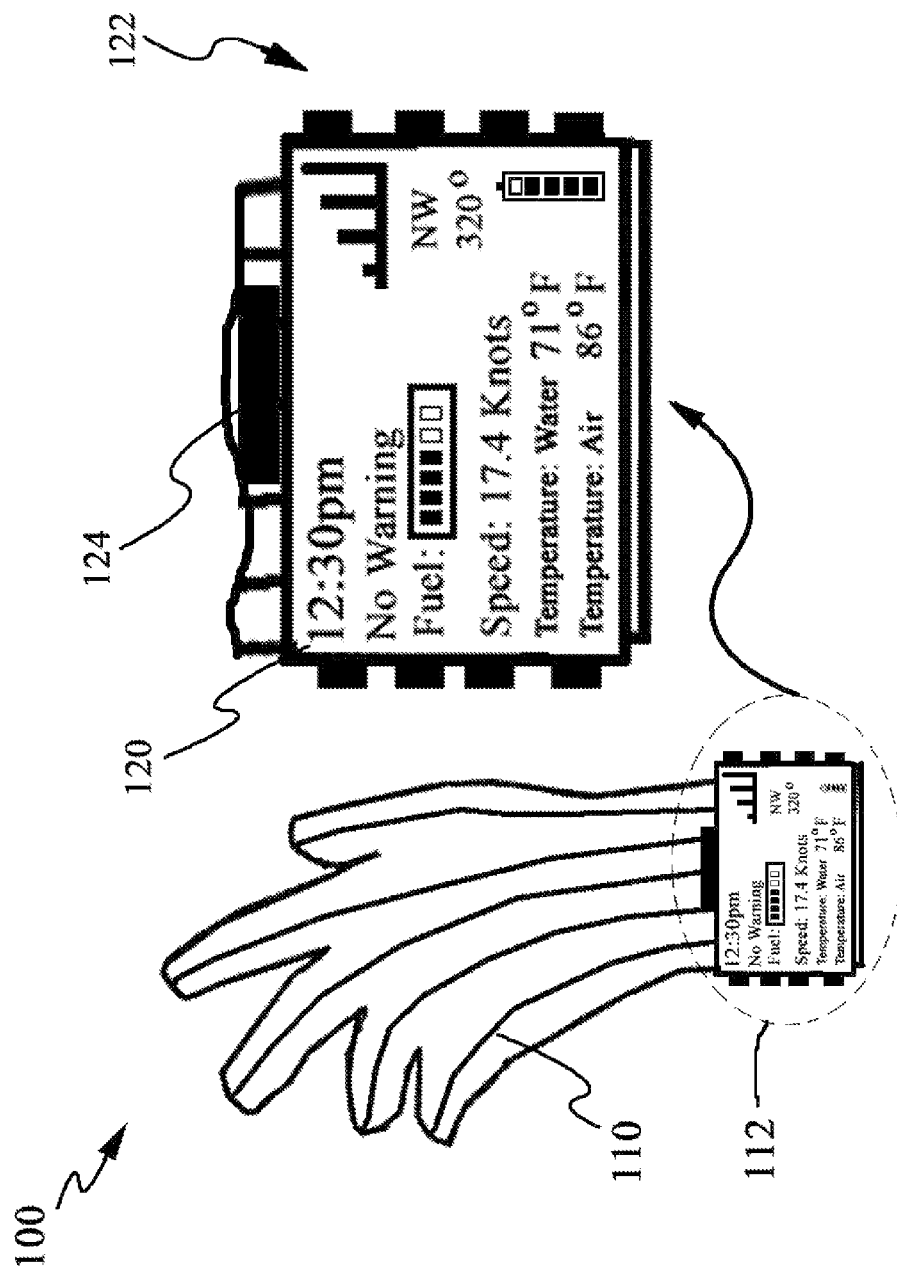
FIG. 7 is a top view of one exemplary embodiment of a wireless controller incorporated into a user module including one exemplary display format.

Referring now to FIG. 7, one exemplary embodiment of a user interface (100) is presented. User interface (100) comprises a glove structure associated with an electronic module (112). Electronic module (112) comprises wireless communication technology for sending and receiving data signals. Electronic module (112) further comprises a user display (120) for displaying information to a user. User display (120) is configured to allow any desired user orientation relative to the glove. For example, user display (120) may be rotated so that display (120) has the same orientation as a typical watch and such orientation may change when the user moves interface (100).

The preferred power source is a long life lithium battery of capable of powering electronic module (112) for at least ten years. For such an embodiment, electronic module (112) is completely encapsulated in a potting material to prevent moisture from entering the module thereby making electronic module (112) a "throw away" device should the module malfunction or when the power source is depleted. The potting material that covers display (120) would be a transparent potting material. Alternatively, at least part of the face of display (120) may be configured to charge the modules power source using photovoltaic technology. Alternatively, electronic module (112) may be configured with a interface for inductively charging the module's power source. Such technology allows electronic module (112) to be completely sealed suing a potting material as described above.

The electronic features of electronic module (112) are described in more detailer later in this document. It should be appreciated that user interface (100) embodiments that do not include a glove structure fall within the scope of the disclosed inventions. For example, user interface (100) may be a simple handheld controller with push buttons where the handheld controller is in wireless communication with controller 34 as well as other devices.

One exemplary display (120) configuration for presenting the various data a user might wish to review is presented in FIG. 7. Such data includes time data, warning data, fuel level data, battery status data, speed data, temperature data, signal strength data, and direction data. Preferably, such display configuration is user programmable allowing the user to select the data that is to be displayed. The time data may be a current time read out or an elapsed time read out (stop watch) for other time data. The warning data may be any warning that the user module (120) is configured to generated or receive from an external device. Fuel Level data presents information relating to the substance used by the propulsion system. Battery Status data related to the power source associated with user module (112). Speed data is data related to the movement of surfboard (10). Temperature data is data related to the temperature of various objects such as water temperature and air temperature. Signal strength data is data describing the relative strength of a received signal for a remote transmitter whether associated with surfboard (10) or some other device. Direction data provides a user with an indication of the direction the electronic module (112) is pointing. Preferably, electronic module (112) may be configured to continuously update the direction data or only up date upon receiving a user request (to save battery life). Similarly, electronic module (112) may be user configurable to up date the displayed information as desired by a user.

Electronic module (112) further comprises user input points (122) and (124). For the preferred embodiment, user inputs (122) are buttons located on one or more sides of electronic module (112). Such user buttons allow a user to change user display (120) as well as set selected user configurable parameters. User input (124) is a user programmable button that may be configured to perform a specific task(s) whenever user input (124) is activated. For the preferred embodiment, user input (124) is configured as a "panic button" that sends a distress signal when activate as well as causing other surfboard features to activate such as the deterrent system.

User interface (100) is one possible device that may be used for controlling the booster system of surf board (10) or a machine control module (508) associated with a motorized land board (504) as described above. For the preferred embodiment, as a user closes her hand, a parameter of one or more control lines (110) changes. For example, the resistive value of control lines (110) changes as control lines (110) are stretched when a user makes a fist. Such changes are sensed by user module (120) and the appropriate booster system control signals are sent to controller (34). Controller (34) generates the necessary control signals to activated one or more thrust-valves (33).

Alternatively, the glove structure may be configured with a control-component that is configured to generate a control signal that is conveyed to electronic module (112). One exemplary embodiment of a control-component is a plunger switch that generates a control signal based on how far the plunger is pressed. Such a control signal may simply be a resistance value.

Electronic Module with a Magnetic Interface

Figure 7B:
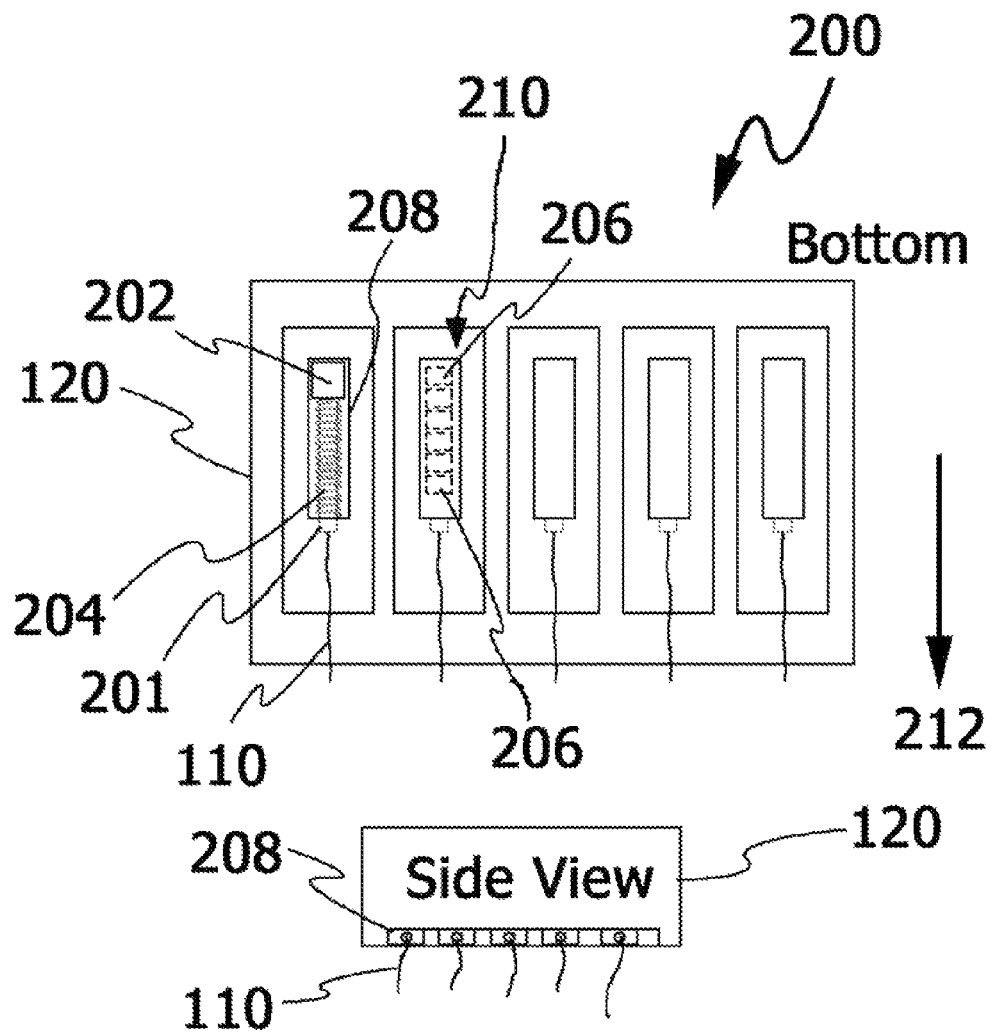
FIG. 7b is a bottom view of the controller of FIG. 7 depicting control lines and a method of coupling control signals generated by a user's hand to said controller.

Referring now to FIG. 7b, a bottom view (200) of one exemplary embodiment of user interface (100) as noted above and depicted. For such embodiment, user interface (100) comprises electronic module (112). As noted above, preferably, electronic module (112) is completely encapsulated in a potting material to prevent moisture from entering the module thereby making electronic module (112) a "throw away" device if the system is not configured with a recharging feature and when the power source is depleted. As noted above, alternatively, the power source for module (112) may be inductively charged requiring no direct electrical connections. The potting material that covers display (120) would be a transparent potting material.

A method of transferring user control signal from a user to interface (100) is now considered. As depicted in FIG. 7, user interface (100) is associated with a glove device configured for generating control signals used use by module (112) to generate the control signals that are transferred to thrust generator (206) or machine control module (508) to selectively activate the thrust generator or to control the throttle of a power land board as previously described. It should be appreciated that other means of generating control signals may be used in place of such glove configuration. For example, a simple push button device may be electrically associated with module (112) for generating such control signals. Additionally, such the "glove features" may be replaced by just the control lines that extend to fingertip caps or that are configured for being placed over or inside a glove.

As noted previously, for the embodiment depicted in FIG. 7, as a user closes her hand, a parameter of one or more control lines (110) changes. For example, control lines (110) form an electrical circuit. Module (112) applies a voltage to control lines (110) and measures the resulting current. When the control lines are stretched by closing the hand and making a fist, the resistive value of control lines (110) changes and such changes are detected by module (112). Module (112) detects the resistance changes of control lines (110) and generates the appropriate control signals.

Referring now to FIG. 7b, for one embodiment, control lines (110) may be strings/cables/wires that pull on magnetic devices (202) associated module (112). Such changes are sensed by user module (112) and the appropriate control signals are transmitted. For example, controller (34) may receive such control signals and generate the necessary control signals to activated one or more thrust-valves (33).

For the configuration depicted in FIG. 7b, control lines (110) are mechanically associated with a first end of shaft (204). A magnetic device (202) is mechanically associated with a second end of shaft (204). Shaft (204) and magnetic device (202) are disposed in housing (208). Housing (208) is disposed adjacent to and outside of user module (112).

It should be appreciated that there are many variations on such design that fall within the scope of the present invention and this disclosure. For example, housing (208) may be an integral component of user module (112). Alternatively, the various housing (208) may be removably associated with user module (112). The goal is to bring magnetic device (202) in close proximity to the bottom surface of user module (112) so that magnetic signals can be transferred to detection circuits within user module (112). One of ordinary skill in the art will appreciate that such a configuration allows a user to generate control signal (by making a fist, for example) wherein such control signals are inductively or conductively or magnetically transferred to user module (112) without providing a path that a liquid (such as water) to penetrate.

A resilient component (204) is associated with shaft (201) that biases the shaft in a default position. As shown in FIG. 7b, the resilient component (204) is a spring disposed around shaft (201) and between magnetic device (202) and an opposing wall of housing (208). As control line (110) is pulled in direction 212, magnetic device (202) moves toward the opposing end of housing (208) thereby compressing resilient component (204). As the pulling force on control lone (110) is removed, resilient component (204) moves magnetic device (202) back toward the default position.

Within user module (112) a magnetic sensor circuit (206) is disposed in a location that will be adjacent to each magnetic device (202) so that sensor circuit (206) may receive magnetic information from magnetic device (202). For the embodiment depicted in FIG. 7, sensor circuit (206) comprises a series of aligned magnetic sensors. As magnetic device (202) moves toward the opposing wall of housing (208) as described above, a first magnetic sensor will receive less information from magnetic component (202) while a second magnetic sensor will receive more information from magnetic component (202). The controller uses such information to perform a predefined action.

For example, suppose magnetic component (202) is a permanent magnet and a series of magnetic sensors (206) are disposed in user module (112) in a location that places such series of magnetic sensors in alignment with the path of movement of magnetic component (202). The series of magnetic sensors (206) in FIG. 7b comprises six sensors in alignment along slot 208. As magnetic component (202) moves along the slot (208), such movement caused by a user making a fist and thereby pulling on string 110 which pulls on shaft (201), a different magnetic sensor in the series of magnetic sensors is activated. When the magnetic is in position 6, magnetic sensor 6 is activated. User module (112) detects that sensor 6 has been activate and generates the corresponding control signal. For this example, such a control signal may be a "full throttle" signal. As the user opens his fists, resilient component (204) pulls magnetic sensor (202) back to the "home" position.

Controller and User Interface

Figure 8:
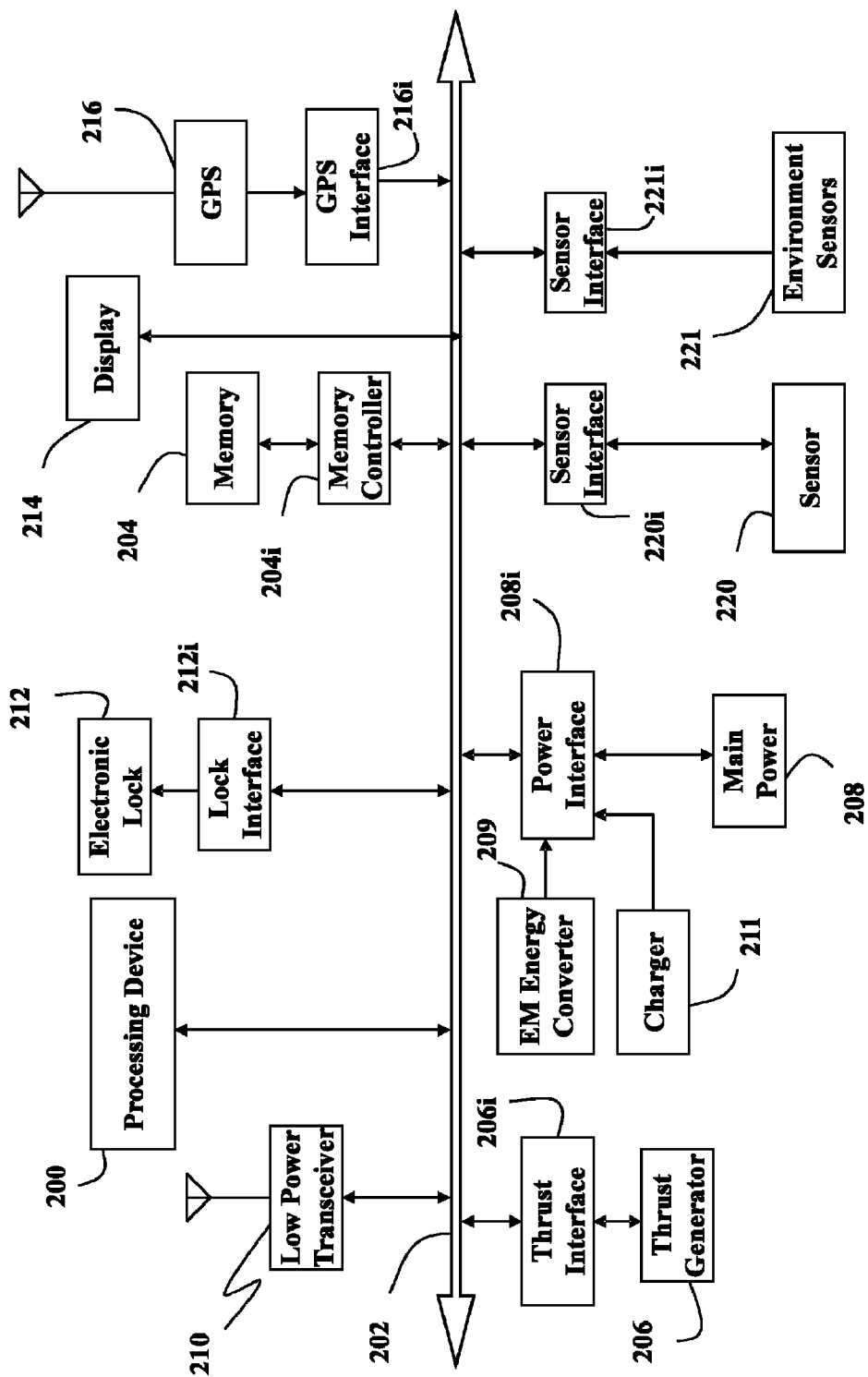
FIG. 8 is a block diagram representation of one exemplary controller configuration.
Figure 9:
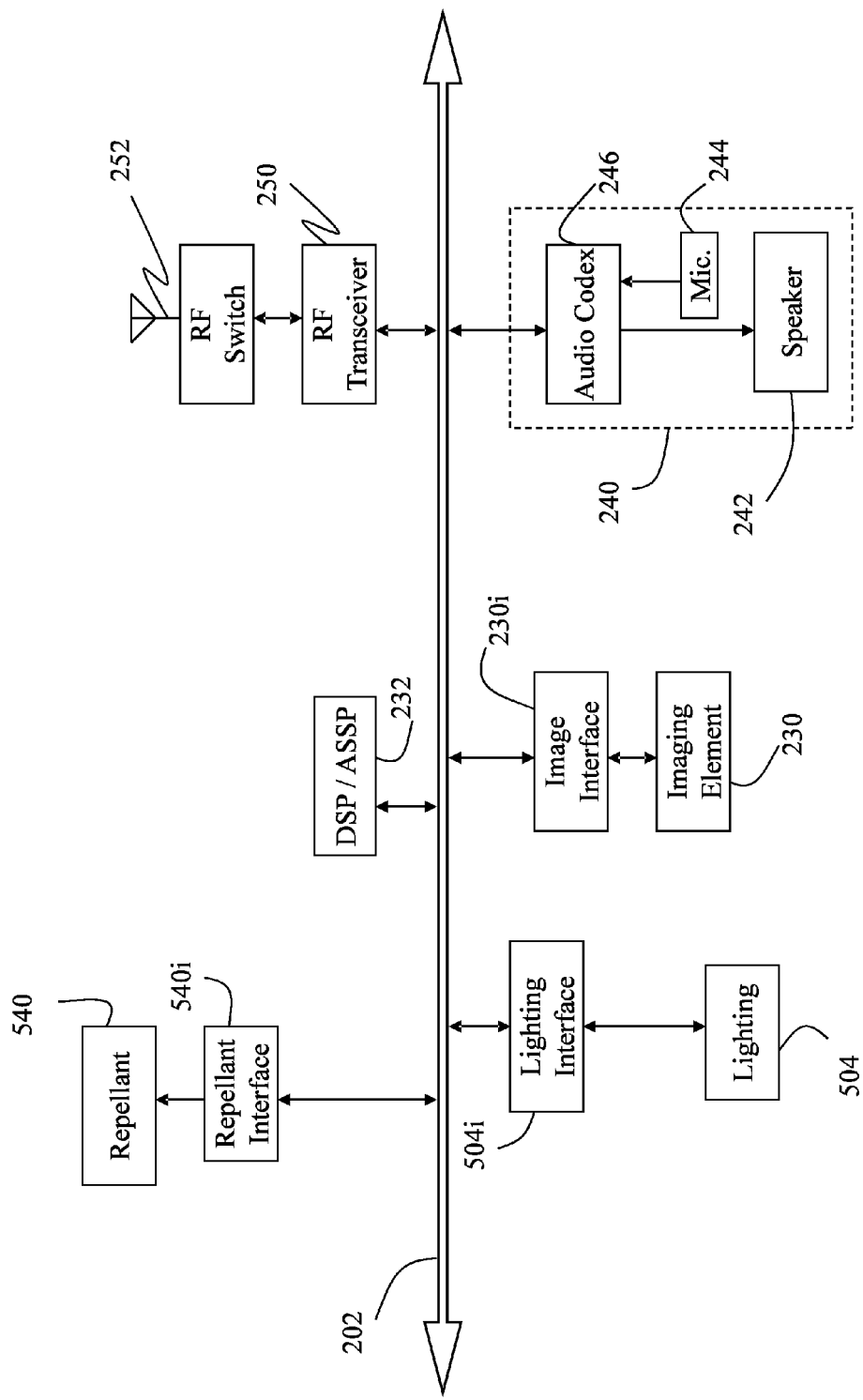
FIG. 9 is a continuation of the block diagram representation of FIG. 8.

Attention will now be directed more specifically to exemplary embodiments of the controller (34) and user interface (100) configurations. Referring now to FIG. 8 and FIG. 9, a block diagram representation of the various electronic components of controller (34) is presented. It should be appreciated that user interface (100) may use the same or substantially similar components. After the components of controller (34) are described, exemplary embodiments of user interface (100) are considered.

Initially it should be appreciated that FIG. 8 presents just one of a plurality of methods of electrically associating the various electronic components to achieve the features desired. For example, FIG. 8 presents the use of a common buss (202) for electrically associating the various components. It should be appreciated that embodiments where certain devices are electrically associated with each other without the use of a buss fall within the scope of the invention. In addition, various embodiments of controller (34) may include all the features presented in FIG. 8, only a subset of subset of such features as well as features not specifically presented in FIG. 8.

Controller

For the presently preferred embodiment, controller (34) comprises either an electronic module integral to surfboard (10) or mechanically associated with surfboard (10). For either such exemplary embodiments, controller (34) is preferably completely encapsulated in a potting material to prevent water contamination. Additionally, any wired connections between controller (34) and external devices are preferably achieved using a non-wicking wiring system.

Additionally, it should be appreciated that many of the electronic components for controller (34) are similarly suitable for user interface (100).

The functional blocks of FIG. 8 represent ASSPs (Application Specific Standard Product), Complex Programmable Logic Devices (CPLD), ASICs (application specific integrated circuit), microprocessors, or PICs. In addition, one or more functional blocks may be integrated into a single device or chip sets such as ASSP chip sets. For example, one or more of the various interfaces described below may be integrated into (or have its described functions performed by) processing device (200).

Manufactures of suitable ASSP devices include Motorola, and Texas Instruments. While most of the functions are preferably performed by ASSP chip sets, Complex Programmable Logic Devices (CPLD) may be used to interface the various ASSP blocks to system buss (202) allowing one system component to interface with another component. Manufactures of suitable CPLD devices include Lattice's (ispMACH 4000 family) and (Altera's MAX 7000-series CPLD).

For the presently preferred embodiment of the invention, processing device (200) is configured to for controlling the various system of surfboard (10) including the data management system, communication system, power management system, deterrent system, propulsion system, lighting system, environmental and user sensor systems, imaging/sound system, anti-theft system, and entertainment system. Processing device (200) may be a simple PIC (such as the ones manufactured by MicroChip) or a relatively more complicated processor configured for use with standard operating systems and application software. Other technologies that may be used include ASICs (application specific integrated circuit) and ASSPs (application specific standard product). Processing device (200) may comprise onboard ROM, RAM, EPROM type memories.

Processing device (200) is electrically associated with buss (202). Buss (202) is configured for providing a communication path between the various electronic devices electrically associated with buss (202). For example, Buss (202) is configured for transferring data signals between processing device (200) and other electronic devices electrically associated with buss (202). For the preferred embodiment, bus (202) also comprises electrical paths for transferring power between main power (208), EM energy converter (209), charger (211) and other electronic devices electrically associated with buss (202). Buss (202) may further comprise a data port and or a power port configured for supplying/receiving power or providing a communication path to electronic devices electrically associated with such port.

Memory (204) is electrically associated with buss (202) via memory controller (204i). Memory (204) may be any type of memory suitable for storing data such as flash memory, SRAM memory, hard drive memory, as well as other types of memories. Volatile memory continuously connected to a power source may be used, although, for the preferred embodiment, memory (204) is nonvolatile memory. Memory (204) may be used for storing all types of data including application programs, image data, sound data, customer information, sensor data, and warning-criteria. Memory (204) is electrically associated with processing device (200) via memory controller (204i) and buss (202).

DSP/ASSP (232, FIG. 8) is electrically associated to processing device (200) via buss (202). DSP (232) is configured to perform signal processing tasks such as voice, audio, video, encoding, decoding as well as other data and signal processing functions. DSP/ASSP technologies are well known in the art and a detailed description thereof is not necessary to provide an enabling description of the present invention.

Display (214) is configured for displaying the various system data received or generated by controller (34). Display (214) is electrically associated with buss (202) and may include technology for providing a customizable touch screen controller configured for control and decoding functions for display (214). For the preferred embodiment display (214) is a LCD display. Additionally, for one embodiment, display (214) comprises a "memory" configured to provide an image when power is removed from the display. For this embodiment, an image is written on the LCD display and when power is removed, the display will retain the image virtually indefinitely. Such a LCD display uses a technique developed by Zenithal Bistable Devices (ZBD), which adds a finely ridged grating to the inner glass surface of an LCD cell of Super-Twist-Nematic (STN) construction. As is known in the art the presence of the grating "latches" the polarization state of the liquid crystals and retains it when power is removed. Preferably, hatch (14) comprises display-section that is at least partially transparent to allow viewing of display (214) without removing the hatch. Alternatively, controller (34) may be disposed within hatch (14)

Controller (34) may further comprise a graphics accelerator that provides support for megapixel cameras and 3D graphics applications. One suitable graphics accelerator is the MQ2100 manufactured by MediaQ. For such a configuration, an imaging device (describe later) associated with board (10) or the board user may be used to record images that are stored in memory (204) and displayed on display (214) upon user request.

For the presently preferred embodiment, thrust generator (206) is electrically associated with processing device (200) through thrust interface (206i). For the presently preferred embodiment, thrust generator (206) comprises propulsion manifold (31), substance-source (32), and thrust-valves (33). Processing device (200) is configured to receive propulsion control signals from user interface (100). Upon receiving such propulsion control signals, processing device (200) generates the corresponding control signals that are transferred to thrust interface (206i) which selectively activates the appropriate thrust-valves to generate the desired thrust. Alternatively, the signals received from user interface (100) may be directly routed to thrust interface (206i).

Exemplary communication circuitry is now considered. For one embodiment, relatively long range wireless communication circuitry includes RF transceiver (250) electrically associated with antenna (252). RF Transceiver (250) is configured to transmit and receive data signals to/from a remote electronic device. It should be noted that embodiments where such communication circuitry comprises only a transmitter or only a receiver fall within the scope of the invention. For one embodiment, transceiver (250) comprises a relatively low power transmitter that transmits a data signal in an unlicensed frequency band. Other embodiments include a relatively longer range transmitter comprising any number of well known technologies for wireless communications transmitting at any legal power level. For example, transceiver (250) may be configured to communicate over GPRS, GSM, GPRS, 3G, and EDGE enabled networks as well as WAP networks.

To facilitate remote access to controller (34) a networking system, such as a local area network (LAN) may be utilized. In this presently preferred embodiment, processing device (200) and memory (204) are configured to form a TCP/IP protocol suite and an HTTP (HyperText Transfer Protocol) server to provide two-way access to the surfboard (10) data. Such TCP/IP protocols and HTTP server technology are well known in the art. For such an embodiment, user controller (34) include an HTTP server and a TCP/IP protocol stack. A gateway is provided that enables continuous remote access to the controller (34).

Generally speaking, a gateway may simply be a means for connecting two already compatible systems. Alternatively, a gateway may be a means for connecting two otherwise incompatible computer systems. For such an alternative configuration, the TCP/IP protocol suite may be incorporated into a gateway serving multiple controller (34) devices via a wired or wireless two-way network using, for example, Wireless Fidelity (Wi-Fi) technology. Such a gateway may incorporate an HTTP server for accessing data from multiple controller (34) devices and for transmission of data to individual user interface (10) devices.

In the above described TCP/IP enabled controller (34) system, a remote transceiver provides access to a first network operating in accordance with a predetermined protocol (TCP/IP is one example). A plurality of controller (34) devices may comprise a second network, such as a LAN. A gateway operatively couples the first network to the second network. Finally, an HTTP server is embedded in either the gateway or the plurality of user interface (100) devices facilitating the transfer of data between the two networks. With such a configuration, one of ordinary skill in the art will appreciate that individual controller (34) device or groups of controller (34) devices may be accessed as if the controller (34) devices were a web site and their information could be displayed on a web browser.

Controller (34) may further be configured for storing and/or generating location data. For embodiments that generate location data, controller (34) includes a position-finder such as GPS device (216) electrically associated with processing device (200) via buss (202) and GSP Interface (216i). GPS (216) is one embodiment of a position-finder electrically associated with a processing device where GPS (216) is configured to generate position-data for the location of controller (34). Alternative embodiments include controller (34) configurations that do not include a GPS but instead received location data from an external device such as user interface (100).

Processing device (200) is configured to use such position-data for providing anti-theft services and mapping services. For the anti-theft configuration, a user places surfboard (10) in a location to be stored. The user then activates the anti-theft system. In response, processing device (200) records current position data. Next processing device (200) monitors the surfboard for motion by: (1) monitoring the output of a motion sensor configured to detect motion; or (2) periodically (at set intervals, random intervals, or upon remote request) access GPS (216) and retrieves real-time position-data and compares the real-time position-data to the stored position-data. If the difference between the two sets of position-data is outside a predefined user threshold, controller (34) causes an alert signal to be transmitter to a remote device such as user interface (100). Controller (34) may further start recording image data and sound data that is transmitted to a remote device. An alert signal may include location data, image data, sound data and any other system data as predefined by the user or board manufacturer.

Alternatively, controller (24) may be configured to transmit at data signal a predefined time intervals. Such data signal may include location data. A device receiving such data signal, such as user interface (100), may monitor the location data from two or more different data signals to determine if movement has occurred. A user may then use user interface (100) to perform any of a plurality of actions including: retrieving image data from board (10), retrieving sound data from board (10), transmitting a lock signal to board (10), and transmitting a sound signal to board (10). For example, a user could use user interface (100) to transmit the following sound message that is played by board (10): "Please put my board back where you found it."

The attributes of exemplary main power (208) are now considered. For the presently preferred embodiment, main power (208) is a long life depletable power source such as a Li Ion battery. For such embodiment, main power (208) comprises at least one long life rechargeable Li Ion battery such as the ones manufactured by A123 Systems®.

Extending the life of main power (208) or extending the time between recharging is one design concern addressed by power interface (208i). Power Interface (208i) is configured to perform power management functions for the system as well as monitor the status of main power (208) and report such status to devices electrically associated with buss (202) (such as processing device (200), user interface (100), etc.). Power interface (208i) dynamically addresses power management issues by selectively powering down unutilized devices. For the Preferred embodiment, power interface (208i) is a CPLD that generates chip-select signals and powers down the various ASSPs as desired. Alternatively, processing device (200) may perform such power management functions.

Electronic lock (212) is electrically associated with processing device (200) through lock interface (212i) and buss (202). For this embodiment, lock interface (212i) is an ASSP or CPLD device configured to change the state of electronic lock (212) in response to control signals received from processing device (200). Similarly, lock interface (212i) may be further configured to communicate the status of electronic lock (212) to devices electrically associated with buss (202). Electronic lock (212) may be a software lock that prevents access to various functions provided by controller (34)/user interface (100). In addition, electronic lock (212) may further be a mechanical lock that provides a location for attaching a restraining device such as a chain.

Imaging element (230) is electrically associated with processing device (200) through image interface (230i) and buss (202). Imaging element (230) and image interface (230i) are configured for acquiring and transferring images to electronic devices electrically associated with buss (202). For the preferred embodiment, imaging interface (230i) is configured to support CMOS image input sensors such as the one manufactured by Micron® and/or CCD (charge-coupled device) image input sensors such as the ones manufactured by ATMEL® sensors. Imaging interface (230i) performs the necessary processing functions to convert the imaging data into a desired format before transferring such data to other devices associated with buss (202). Both Board (10) may be configured with an imaging element (230) for recording surfing activities (as well as other activities). Such image data is formatted and stored in memory (204) for later use.

Low Power transceiver (210) would typically comprise a low power transmitter relative to transceiver (250). For the embodiment in FIG. 8, low power transceiver (210) operates in an unlicensed band although frequencies requiring a license may be used. Suitable technologies include Bluetooth and Zigbee (IEEE 802.15). Zigbee is a low data rate solution for multi-month to multi-year battery life applications. Zigbee operates on an unlicensed, international frequency band. Such technologies are known and understood by those skilled in the art, and a detailed explanation thereof is not necessary for purposes of describing the method and system according to the present invention. Low power transceiver (210) is configured for short range communication with other suitably configured devices.

Attention now is directed to audio module (240). For the preferred embodiment, audio module (240) comprises sound transducer (242) and microphone (244) electrically associated with audio codex (246). Audio module (240) is configured for detecting sound waves and converting such waves into digital data of a predefined format such as MP3. Sound waves may also be generated by audio module (240) using sound transducer (232) to issue warnings and provide for other forms of communications. For example, audio module (24) may be used for voice communications between a person located at controller (34)/user interface (100) and a person located at a remote site, using, for example, VoIP for the IP enabled systems describe earlier. Audio module (240) may also be used to play MP3 files stored in memory (204) or via streaming data over a communication connection.

EM (electromagnetic) Energy Converter (209) is electrically associated with power interface (208i) and mechanically associated with the top of surfboard (10). EM Energy Converter (209) is configured to convert electromagnetic energy (such as a radiated RF signal from a man made transmitter, sunlight, etc.) into a voltage for supplying power to system components and/or supplying energy to a power source. One well known EM Energy Converter is a photovoltaic cell. Such technologies are well known in the art.

Similarly, a charger (211) may be electrically associated with power interface (208i) via a direct connection or via buss (202). Conger (211) is suitably configured for recharging main power 208 as well as providing power to controller (34).

As noted previously, embodiments of surfboard (10) may includes deterrent system that may be (a) automatically deployed or (b) deployed in response to a user. Preferably, the deterrent system is particularly suitable for addressing sharks. One exemplary automatic deterrent system uses a eukaryote sensor that is configured to sense a particular type of animal. For example, the sensor may be a sonar based system that transfers sensor data to controller (34). Such sensor data would suitable for determining the shape of objects in close proximity of board (10). Additionally, sample-shapes would be stored in a memory associated with controller (34). If a detected animal shape is determined to be substantially similar to a sample-shape, controller (34) would automatically deploy a deterrent device. Sonar based system for detecting objects in water are well known in the art and a detail description thereof is not necessary for providing an enabling disclosure of this attribute of the invention.

Repellant system (540) is configure dispense a deterrent device upon command of repellant interface (540i). One suitable deterrent device is a chemical-dispenser. For this example, the animal of interest is a shark. The chemical-dispenser (540) is mechanically associated with at least one of output ports (22rp), (20rs), (24fp), and (24fs). When controller (34) detects an animal having a shape corresponding to a sample-shape, controller (34) generates deployment signals that are transferred to repellant interface (540i) which in turn causes repellant system (540) to deploy a chemical. When the chemical-dispenser (540) is activated, a chemical substance is dispensed through one or more output ports so that a cloud (80) is formed around surfboard (10) and/or the user. It should be appreciated that a user may manually activate repellant system (540) when desired.

For one embodiment, the chemical substance is a broad-spectrum-semiochemical (BSS) mixture comprising a combination of semiochemicals known to be effective for repelling one or more species of sharks. It should be appreciated that other chemical compounds known to be effective for repelling sharks may be used without out departing from the spirit and scope of the present invention. As described previously, other deterrent devices may be deployed in a similar manner.

Lighting device (504) comprises lighting modules 16a, 16b, 16c, and 16d. Any number of lighting modules may be used. Preferably, lighting devices (504) are configured to be removably associated with board (10) and include their own power source which may or may not be configured for receiving power from main power (208).

Sensors (220) and Environment Sensors (221) may be any number of devices configured to detect any number of parameters related to board (10), a user, and board (10)/user environment. Environment sensors (221) include sonar, User Interface For the preferred embodiment, user interface (100) is configured using identical or similar technology to the technology described above for controller (34). User interface (100) may comprise devices similar or identical to any of the following (depending on the desired functionality): a processing device (200), main power (208), memory (204), display (120), RF transceiver (250), low power transceiver (210), GPS (216), DSP (232), imaging element (230), audio element (240), EM energy converter (209), and a charger (211) all electrically associated together through a buss such as bus (202).

It will be appreciated that while some embodiments of user interface (100) may be specifically configured for use with surf boards (10), other embodiments of user interface (100) may be configured to control a variety of powered riding apparatus' configured with electronic controls. Such devices include powered skate boards and other devices with wheels and powered by motors or other types of propulsion systems where the user needs a wireless communication connection for transferring control signals to the powered device. For example, where the powered device is a motorized skate board, thrust generator (206) becomes the motor and user interface (100) controls the output power of such motor.

User interface (100) may further comprise a biometric sensor. Such a Biometric sensor is used as a "key" to access controller (34)/user interface (100) functions such as the previously described electronic lock. Biometric identification refers to the automatic identification of a person based on his/her physiological or behavioral characteristics. A biometric system is essentially a pattern recognition system which makes a personal identification by determining the authenticity of a specific physiological or behavioral characteristic possessed by a user. The biometric system may include, for example, a handwriting recognition system, a voice recognition system and fingerprint recognition.

For the preferred embodiment of the invention, the sensor (220) includes a fingerprint scanner. For such embodiment of the invention, a user initially places a finger on biometric sensor (220). The biometric sensor scans the finger and transfers a digital representation of the user's fingerprint to memory (204). Such an initial bio sample is called an enrolment sample. After an enrolment sample has been stored in memory, future user controller (34)/interface (100) actions are authorized by comparing a user's real time fingerprint scan to the enrolment sample.

Display (120) is preferably an LCD display similar or identical to that described for display (214), although any suitable technology may be used. As noted above and depicted in FIG. 7, one embodiment of user interface (100) comprises electronic module (112). Preferably, electronic module (112) is completely encapsulated in a potting material to prevent moisture from entering the module thereby making electronic module (112) a "throw away" device should the module malfunction or when the power source is depleted. Alternatively, the power source for module (112) may be inductively charged requiring no direct electrically connections. The potting material that covers display (120) would be a transparent potting material.

As depicted in FIG. 7, user interface (100) is associated with a glove device configured for generating control signals used use by module (112) to generate the control signals that are transferred to thrust generator (206) to selectively activate the thrust generator as previously described above. It should be appreciated that other means of generating control signals may be used in place of such glove configuration. For example, a simple push button device may be electrically associated with module (112) for generating such control signals. As noted previously, for the embodiment depicted in FIG. 7, as a user closes her hand, a parameter of one or more control lines (110) changes. For example, control lines (110) form an electrical circuit. Module (112) applies a voltage to control lines (110) and measures the resulting current. When the control lines are stretched by closing the hand and making a fist, the resistive value of control lines (110) changes and such changes are detected by module (112). Module (112) detects the resistance changes of control lines (110) and generates the appropriate control signals.

Alternatively, control lines (110) may be strings/cables/wires that pull on sensors within module (112). Such changes are sensed by user module (120) and the appropriate booster system control signals are sent to controller (34). Controller (34) generates the necessary control signals to activated one or more thrust-valves (33).

As previously described, one exemplary display (120) configuration for presenting the various data a user might wish to review is presented in FIG. 7. Such data includes time data, warning data, fuel level data, battery status data, speed data, temperature data, signal strength data, and direction data. Preferably, such display configuration is user programmable allowing the user to select the data that is to be displayed. The time data may be a current time read out or an elapsed time read out (stop watch) for other time data. The warning data may be any warning that the user module (120) is configured to generated or receive from an external device. Fuel Level data presents information relating to the substance used by the propulsion system. Battery Status data related to the power source associated with user module (112). Speed data is data related to the movement of surfboard (10). Temperature data is data related to the temperature of various objects such as water temperature and air temperature. Signal strength data is data describing the relative strength of a received signal for a remote transmitter whether associated with surfboard (10) or some other device. Direction data provides a user with an indication of the direction the electronic module (112) is pointing. Preferably, electronic module (112) may be configured to continuously update the direction data or only up date upon receiving a user request (to save battery life). Similarly, electronic module (112) may be user configurable to up date the displayed information as desired by a user.

Referring now to FIG. 2, one exemplary embodiment of a user interface (100) is presented. User interface (100) comprises a glove structure associated with an electronic module (112). Electronic module (112) comprises wireless communication technology for sending and receiving data signals. Electronic module (112) further comprises a user display (120) for displaying information to a user. User display (120) is configured to all any desired user orientation relative to the glove. For example, user display (120) may be rotated so that display (120) has the same orientation as a typical watch.

The preferred power source is a long life lithium battery of capable of powering electronic module (112) for at least ten years. Such an embodiment, electronic module (112) is completely encapsulated in a potting material to prevent moisture from entering the module thereby making electronic module (112) a "throw away" device should the module malfunction or when the power source is depleted. Alternative embodiments include configurations where electronic module (112) comprising electrically for receiving power via a coupling method where the power is transmitted through the walls of the controller without the need for a direct connection. When electronic device (112) is encapsulated in a potting material, the potting material that covers display (120) would be a transparent potting material. The electronic features of electronic module (112) are described in more detailer in co-pending application Ser. No. 12/106,323 and filed on 20 Apr. 2008.

Wave Information System and Smart Buoy

Figure 10:
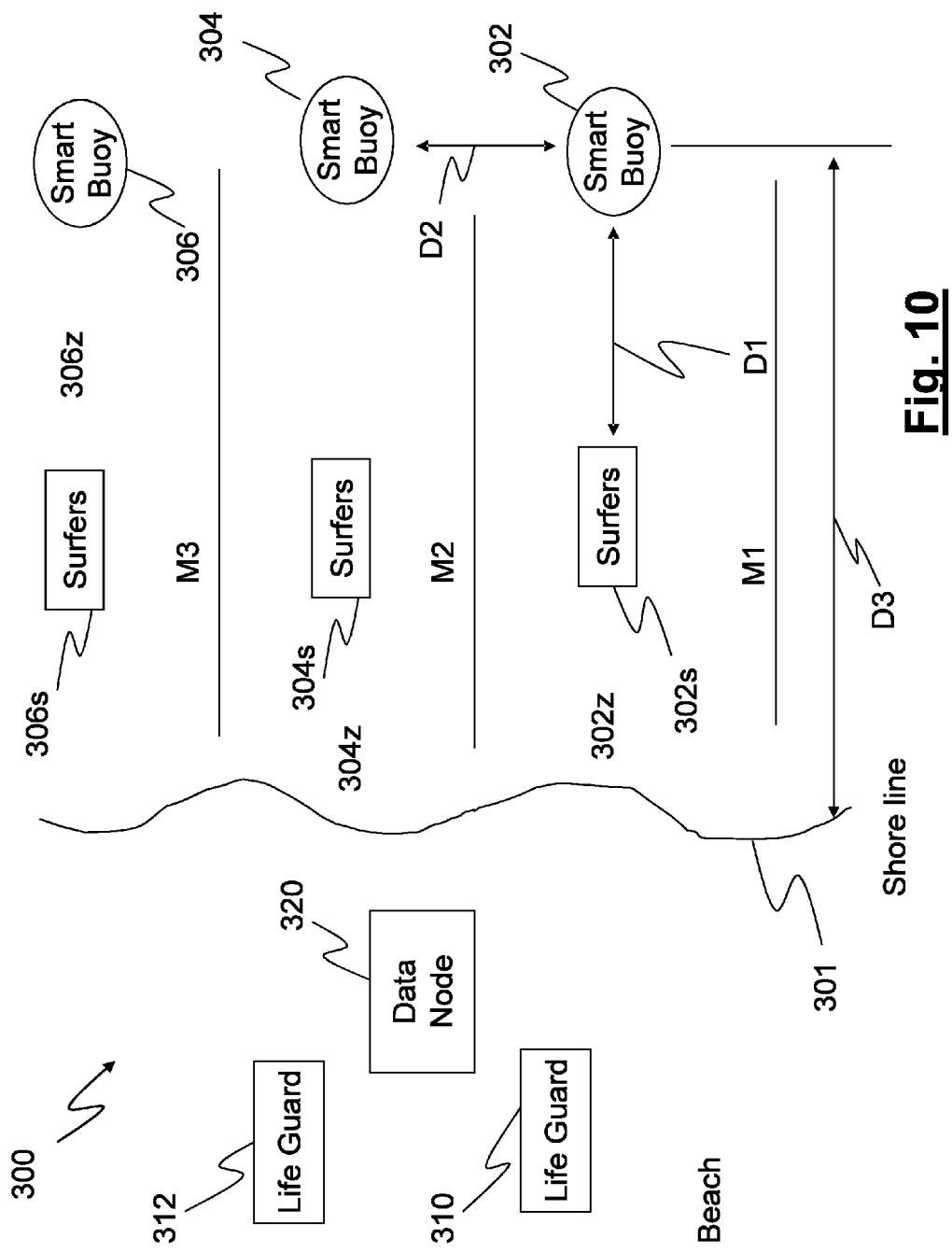
FIG. 10 is a representation of one exemplary wave information system.

In addition to the above data, one embodiment of user interface (100) is configured to receive data from an external data source. One such external data source is the wave information system (300) depicted in FIG. 10. One exemplary wave information system (300) is presented in FIG. 10 comprising at least one smart buoy (302).

Smart buoy (302) comprises an electronic buoy module configured for detecting a plurality of water/wave parameters and transmitting data related to such information to a remote location. For the embodiment shown in FIG. 10, there are three smart buoys disposed a distance D2 apart along a parallel path relative to shore line (301) at a distance D3 from the shore line (301). Similarly, smart buoy devices may be disposed along a perpendicular path relative to shore line (301) as well as random placements. Each buoy is configured to sense/detect a predefined set of water/environment parameters and transmit a data signal communicating such parameters to remote devices. For example, smart buoy (302) may be configured to sense water parameters such as wave conditions that will eventually propagate through zone (302$z$). Surfers (302$s$) and life guard (310) may have embodiments of user interface (100) (with or without the glove) configured to receive transmissions from smart buoy (302). Such information may be used by surfers (302$s$) to catch a set of waves, catch a particular wave, or avoid a set of waves. Life guard (310) may use information received from buoy (302) to improve beach safety.

Before considering the smart buoy configurations, it may be help to first consider wave dynamics. Looking out at the water, an ocean wave in deep water may appear to be a massive moving object—a wall of water traveling across the sea surface. But in fact the water is not moving along with the wave. The surface of the water—and anything floating atop it, like a boat or buoy—simply bobs up and down, moving in a circular, rise-and-fall pattern. In a wave, it is the disturbance and its associated energy that travel from place to place, not the ocean water. An ocean wave is therefore a flow of energy, traveling from its source to its eventual break-up. This break up may occur out in the middle of the ocean, or near the coast in the surf zone (such as 304$z$).

Figure 11:
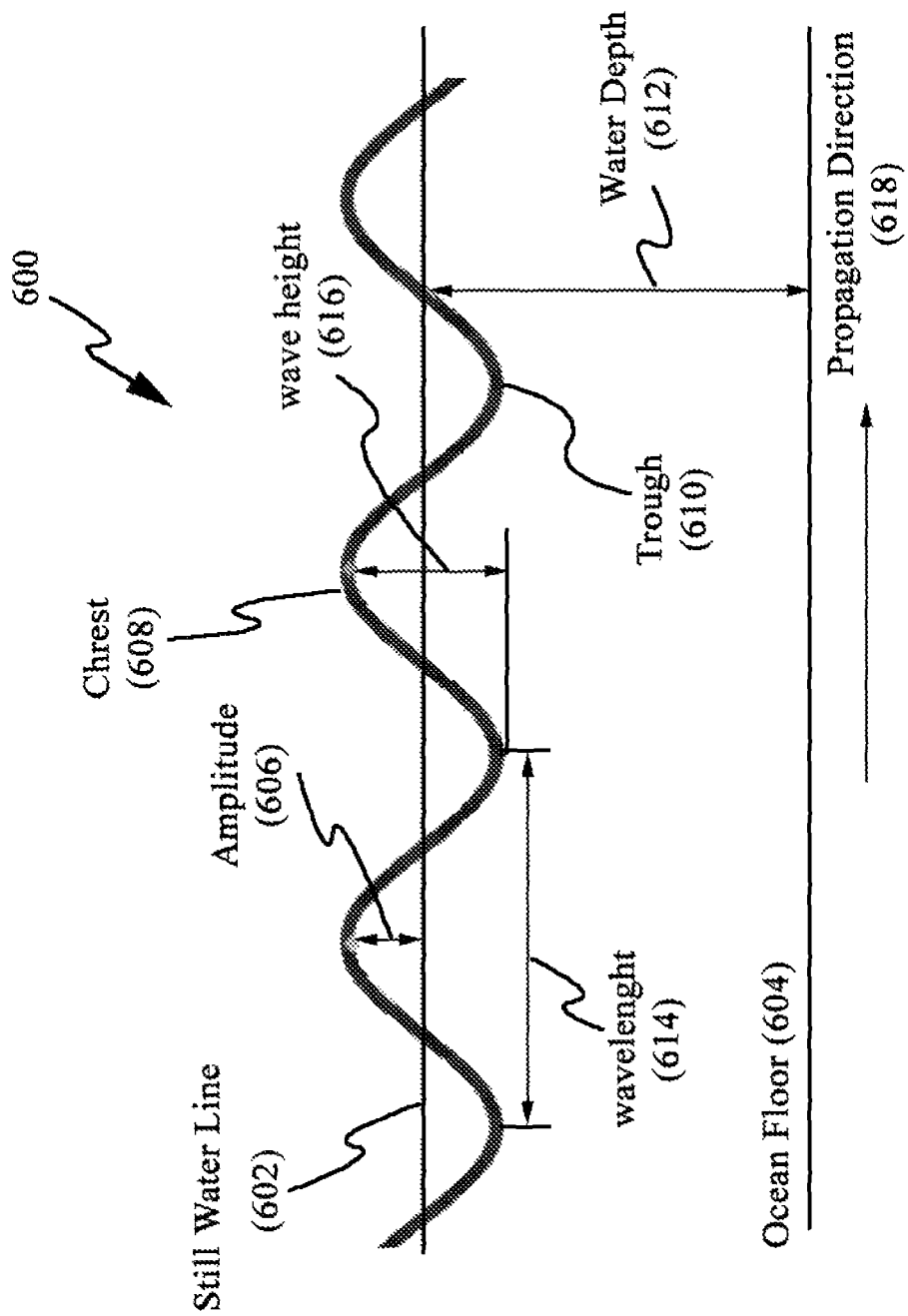
FIG. 11 is a diagram of various wave parameters.

Referring now to FIG. 11, Smart Buoy configurations are now considered. Buoy modules configured for detecting/determining wave parameters are know in the art and include system National Oceanic and Atmospheric Administration (NOAA) and Scripps/CDIP systems. In addition, custom designs may be employed where such designs are configured to minimize cost and power consumption. Such a buoy module is associated with a buoy and configured to detect/sense/calculate at least one of the following parameters: water line (602), wave amplitude (606), wave crest (608), wave height (616), trough (610), water depth (612), wave length (614), and propagation direction. Buoys configured to perform such measurements are known in the art and a detailed description is not necessary for the purposes of providing an enabling description of the present invention. Smart buoy (302), (304), and (306) comprise a buoy module electrically associated with a buoy controller (350). Buoy controller (350) comprises one or more of the following components as described above (or similar components): processing device (200), main power (208), memory (204), display (120), RF transceiver (250), low power transceiver (210), GPS (216), DSP (232), imaging element (230), audio element (240), EM energy converter (209), and a charger (211) all electrically associated together via a buss.

Smart buoy (302), (304), and (306) and configured to transmit a wave-information data signal in a compatible format so that user interface (100) and/or data node (320) or any similarly configured devices authorized to receive such signals can receive and use the data contained in the wave-information data signal. Such wave-information data signal may comprise any of the following: access code, buoy location data, wave height, wave time stamp, current time, wave speed, water temperature, wind speed, humidity, sun intensity, barometric pressure, as well as any of the wave parameters previously described. The wave time stamp is simply a time stamp for the recorded data indicating when the data was recorded. The current time data is the current buoy time which may be used by other devices to synchronize the relative timing devices or generate a time offset so that "buoy time" can be related to "user time" (for example, user time is the current time for the user interface (100). For example, "buoy time" may be 12:00.30 pm and "user time" may be 12:03.40 pm. For such times, the time offset would be 2 minutes and 10 seconds (2.10).

The receiving device (e.g. user interface (100)) receives the wave-information data signal which may be presented to a user and/or used to generate additional data. One calculated value is a wave Estimated Time of Arrival (ETA) value. For wave ETA data, the user interface uses the following wave-information data: time stamp, wave speed, buoy time value, and buoy location data. User interface (100) determines the time offset if any. Next, user interface (100) determines its location data and uses the buoy location data to determine the distance between the buoy and user interface (100). User interface (100) then uses the wave speed data to calculate an ETA value. User interface (100) may be configured to display a series of waves in a graphical format along with each wave's associated ETA information as well as other wave parameters.

User interface (100) is also configured to detect a predefined "clean up" wave set. A "clean up" wave set is potentially dangerous condition where a surfer may be unaware of multiple waves propagating toward the surfer in a back to back sequence. If such a surfer tries to surf the first wave of a clean up wave set, such surfer may be severely injured/drowned. User Interface (100) is configured to detect a predefined number of waves with predefined wave parameters and defined such wave set as a clean up wave set and warns a user. Alternatively, the smart buoy may be configured to issue "clean up wave set" warnings.

Smart buoy (302), (304), and (306) may be further configured with sensors such as sonar for detecting various types of fish. For example, smart buoy (302), (304) and (306) may be configured with the stored sonar profile data and/or image profile data for a particular fish, (e.g. shark). When a smart buoy detects the sonar profile of a fish, the smart buoy compares the real time sonar profile with the stored sonar profile. If there is a match, the buoy issues a shark warning. In addition, the smart buoy may then take image data (if equipped with imaging elements described above) of the item detected. Such smart buoy then uses image recognition software to compare the real time image with stored image data. If the two images meet predefined comparison criteria, a shark warning is issued. Suitable image recognition software includes well known facial recognition software as well as software specifically configured for animal recognition.

In addition to detecting animals such as sharks, smart buoy may be further configured to detect schools of fish. For such configuration, smart buoy periodically scans for any items under the surface of the water. When items are detected a digital representation of such sonar image is stored in memory and/or processed to determine the number and size of such fish along with a time stamp.

It will be appreciated that a smart buoy may be configured to receive and retransmit a data-signal transmitted from other smart buoys. Such a configuration allows a chain of smart buoys to be disposed in a body of water to extend the range of such a system. For such a system the range is limited only by the number of buoys deployed.

In addition to user interface (100) receiving a smart buoy data signal, data node (320) is configured for receiving a smart buoy data signal. Date node (320) is further configured to retransmit such data to a remote location via a wired or wireless communication connection. Preferably, data node (320) is connected to an external network via (e.g. internet) via a wired connection. The information received by data node (320) is then transferred to a website where anyone with access rights can view such smart buoy information including: image data, wave data, temperature data, sound data, fish data (i.e. detection of schools of fish) or any other data generated by a smart buoy.

Such website data preferably contains real time and historical data. Historical data comprises old data that may be generated using statistical theories to provide a better understanding of real time data. For example, real time fish data may be associated with historical fish data to generate a data confidence value.

One user of such a system may be owners of fishing boats that charter their boats to people wishing to fish. Such owners would purchase rights to the website to view fish sighting data. Using such data, the fishing boat can better determine what fishing spots are more likely to provide better fishing.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A motorized land board and wireless controller system, said motorized land board comprising:
   a board structure defining a front section and a back section and a top surface and an opposing bottom surface defining the general shape of a skateboard, wherein a first set of wheels is mechanically associated with the bottom of the front section and as second set of wheels is mechanically associated with the bottom of the back section;
   a motor disposed along said back section wherein the output of said motor is mechanically associated with at least one wheel of said second set of wheels, said motor comprising a motor-throttle for controlling the output power of said motor;
   a controller mechanically associated with at least one of (a) said back section, (b) said front section, and (c) said motor, said controller comprising:
   (a) a processor electrically associated with a memory;
   (b) a receiver electrically associated with said processor and an antenna, said receiver configured for receiving a data-signal from an remote transmitter and transfer at least part of such data-signal to said processor;
   (c) a throttle controller electrically associated with said processor and mechanically associated with said motor-throttle,
   (d) a power source electrically associated with at least one of said processor, receiver, and said throttle controller;
   wherein said processor is configured to generate throttle control signals based at least in part on a received data-signal, wherein said throttle control signals cause the throttle controller to manipulate said motor-throttle; and
   an user interface configured for being associated with a user without being held in the user's hand, said user interface comprising a communication module comprising a transmitter in wireless communication with said controller, said user interface configured to generate and transmit said data-signal in response to a user hand movement.

2. A motorized land board and wireless controller system as in claim 1, wherein said controller further comprises an ignition-controller electrically associated with said processor and the ignition system of said motor, wherein said processor is further configured to generate ignition-control-signals that cause said ignition-controller to manipulate the spark generated by said ignition system.

3. A motorized land board and wireless controller system as in claim 1, said controller further comprising an information interface electrically associated with said processor and configured for being electrically associated with an information source associated with said motor, wherein said information interface is at least one of: (a) a temperature sensor configured for generating sensor signals representative of a temperature including one of the motor temperature and ambient air temperature; (b) a RPM sensor configured for generating sensor signals representative of the motor's RPMs; (c) a fuel sensor configured for generating sensor signals representative of the amount of fuel remaining in a fuel source; (d) a power quality sensor configured for generating sensor signals representative of output power levels of a power generator; and (e) a speed sensor configured for generating sensor signals representative of the speed of the motorized land board.

4. A motorized land board and wireless controller system as in claim 3, wherein said processor is further configured to transmit a sensor-data-signal based on data received form said information interface.

5. A motorized land board and wireless controller system as in claim 4, wherein said user interface communication module further comprises a receiver configured for receiving a sensor-data-signal and said user interface further comprises a display configured for displaying information to a user and wherein said user interface is configured to generate a display image based at least in part on said sensor-data-signal.

6. A motorized land board and wireless controller system as in claim 5, wherein said communication module further defines at least one of (a) a cell phone, (b) a walkie talkie system, and (c) a two-way transmitter system.

7. A motorized land board and wireless controller system as in claim 4, wherein said wherein said communication module is in wired or wireless communication with an external transceiver associated with said user, said external transceiver defining at least one of (a) a cell phone, (b) a walkie talkie system, and (c) a two-way transmitter system.

8. A motorized land board and wireless controller system as in claim 7, wherein said user interface is configured to store map data comprising safety information for a particular area, and wherein said transceiver is configured to generate GPS location data and wherein said user interface is configured to issue warnings based on said GPS location data and said map data.

9. A motorized land board and wireless controller system as in claim 7, wherein said transceiver is configured to generate GPS location data and wherein said user interface is configured to automatically transmit location data for the current location of the user interface.

10. A motorized land board and wireless controller system as in claim 9, wherein said information interface comprises a video recording device.

11. A portable user interface for controlling a powered riding apparatus configured with an apparatus-controller, said user interface comprising:
- a housing configured for being associated with a powered riding apparatus user without being carried in the user's hand;
- a processing device disposed within said housing and electrically associated with at least one of (a) on-chip memory and (b) off-chip memory;
- a first transmitter disposed within said housing and electrically associated with said processing device, said first transmitter configured for communicating with said apparatus-controller;
- a control signal interface disposed within said housing and electrically associated with said processing device, said control signal interface configured for being associated with a user-control-signal-generator;
- a power source disposed within said housing and electrically associated with at least one of said processing device, said first transmitter, and said control signal interface;
- a user-control-signal-generator mechanically associated with a user and electrically associated with said control-signal-interface wherein said user-control-signal-generator is configured to generate user-control-signals is response to an user action; and
- wherein said processing device is configured to generate apparatus-control-signals in response to said user-control-signals and transmit said apparatus-control-signals to said apparatus-controller.

12. A portable user interface for controlling a powered riding apparatus as in claim 11, wherein said user-control-signal-generator defines a glove apparatus worn by a user comprising at least one control line running along at least one finger of said glove and wherein an electrical parameter of said control line changes as said user makes a fist.

13. A portable user interface for controlling a powered riding apparatus as in claim 11, further comprising a receiver electrically associated with said processing device and wherein said powered riding apparatus is a surfboard comprising propulsion system electrically associated with said apparatus-controller, said apparatus-controller further electrically associated with said portable user interface, and wherein said processing device is configured to use said receiver to receive wave-information-data transmitted by a remote system.

14. A portable user interface for controlling a powered riding apparatus as in claim 13, wherein said processing device is configured to use said wave-information-data to calculate estimated time of arrival (ETA) data for at least one wave.

15. A portable user interface for controlling a powered riding apparatus as in claim 14, wherein said portable user interface further comprises a display electrically associated with said processing device and wherein said processing device is further configured to cause wave information to be displayed on said display.

16. A portable user interface for controlling a powered riding apparatus as in claim 15, wherein said processing device is further configured to monitor said wave-information-data for a predefined set of wave parameters and issue a warning when said predefined set of wave parameters is detected.

17. A portable user interface for controlling a powered riding apparatus as in claim 16, wherein said predefined set of wave parameters is a clean-up-wave-set.

18. A wireless controlled motorized land board comprising:
- an user interface defining a housing configured for being associated with a user without being carried in the user's hand, said user interface comprising:
    (a) an ui-processing device disposed within said housing and electrically associated with at least one of (a) on-chip memory and (b) off-chip memory;
    (b) an ui-transmitter disposed within said housing and electrically associated with said ui-processing device;
    (c) a ui-control-signal-generator disposed at least partially outside of said housing and mechanically associated with a user, said ui-control-signal-generator configured to generate a user-control-signal is response to a user action;
    (d) a control signal interface disposed within said housing and electrically associated with said ui-processing device, said control signal interface configured for receiving said user-control-signal;
    (e) a power source disposed within said housing and electrically associated with at least one of said ui-processing device, said ui-transmitter, and said user-control-signal-interface;
- wherein said ui-processing device is configured to generate and transmit an apparatus-control-signal in response, at least in part, to said user-control-signal;
- a board structure defining the general shape of a skateboard comprising a front section and a back section and a top surface and an opposing bottom surface, wherein a first wheel set comprising at least one wheel is mechanically associated with the bottom of the front section and second wheel set comprising at least one wheel is mechanically associated with the bottom of the back section;
- a motor mechanically associated with at least one of (a) the board structure, (b) said first wheel set, and (c) said second wheel set, and wherein the output of said motor is mechanically associated with at least one of said first wheel set and said second wheel set and wherein the power output of said motor is controlled by a power-output-controller, said power-output-controller comprises:
    (a) controller-processing device electrically associated with at least one of on chip or off chip memory;
    (b) a controller-receiver electrically associated with said controller-processing device;
    (c) an antenna electrically associated with said controller-receiver; and
    (d) a power source;
- wherein said controller-processor is configured to control the power output of said motor based at least in part on a received apparatus-control-signal.

19. A wireless controlled motorized land board as in claim 18, wherein said control signal interface comprises at least one magnetic field sensor and wherein said ui-control-signal-generator comprises a magnetic field generating component wherein the magnetic field generating component is configured to move in response to a user hand movement thereby changing the magnetic flux lines impinging on the surface of said at least one magnetic field sensor.

20. A wireless controlled motorized land board as in claim 19, wherein said magnetic field generating component is a magnet movably associated with said housing and mechanically associated with a finger of said user and wherein said ui-control-signal-generator is mechanically external to said housing but in magnetic communication with said control signal interface and wherein said housing is sealed to prevent entry of fluid into said housing.

* * * * *